(12) United States Patent
Gnad et al.

(10) Patent No.: US 11,292,075 B2
(45) Date of Patent: Apr. 5, 2022

(54) METHOD FOR INTERMITTENT ULTRASONIC PROCESSING OF A LENGTH OF MATERIAL

(71) Applicant: Herrmann Ultraschalltechnik GmbH & Co. KG, Karlsbad (DE)

(72) Inventors: Gerhard Gnad, Keltern (DE); Bastian Ewald, Waldbronn (DE); Armin Geiger, Ettlingen (DE)

(73) Assignee: HERRMANN ULTRASCHALLTECHNIK GMBH & CO. KG, Karlsbad (DE)

( * ) Notice: Subject to any disclaimer, the term of this patent is extended or adjusted under 35 U.S.C. 154(b) by 161 days.

(21) Appl. No.: 16/478,885

(22) PCT Filed: Apr. 6, 2018

(86) PCT No.: PCT/EP2018/058937
§ 371 (c)(1),
(2) Date: Jul. 18, 2019

(87) PCT Pub. No.: WO2018/189057
PCT Pub. Date: Oct. 18, 2018

(65) Prior Publication Data
US 2019/0381599 A1    Dec. 19, 2019

(30) Foreign Application Priority Data

Apr. 10, 2017   (DE) .................... 10 2017 107 617.4

(51) Int. Cl.
*B23K 20/00* (2006.01)
*B23K 20/10* (2006.01)

(52) U.S. Cl.
CPC .......... *B23K 20/103* (2013.01); *B23K 20/106* (2013.01)

(58) Field of Classification Search
CPC .... B23K 20/10; B23K 11/0026; B23K 11/008
See application file for complete search history.

(56) References Cited

U.S. PATENT DOCUMENTS

| 4,313,778 A | 2/1982 | Mims |
| 5,840,154 A | 11/1998 | Wittmaier |

(Continued)

FOREIGN PATENT DOCUMENTS

| CN | 101124063 A | 2/2008 |
| CN | 202896908 U | 4/2013 |

(Continued)

OTHER PUBLICATIONS

Wo2016/074983A1 computer english translation (Year: 2021).*

(Continued)

*Primary Examiner* — Erin B Saad
(74) *Attorney, Agent, or Firm* — Paul & Paul

(57) ABSTRACT

The present invention relates to a method for intermittent ultrasonic processing of a length of material, wherein a length of material is moved through between a sonotrode and a counter-tool and the length of material is processed intermittently. In order to specify a method for intermittent ultrasonic processing of a length of material by which the disadvantages of the prior art can be avoided or at least reduced, according to the invention it is suggested that in a processing interval the sonotrode is stimulated by an ultrasonic oscillation with an oscillation amplitude A and in a movement interval the sonotrode is stimulated with an oscillation amplitude B, wherein B<A and during the processing interval and during the movement interval the length of material touches both the sonotrode and also the counter-tool.

16 Claims, 2 Drawing Sheets

(56) References Cited

U.S. PATENT DOCUMENTS

Figure 1:
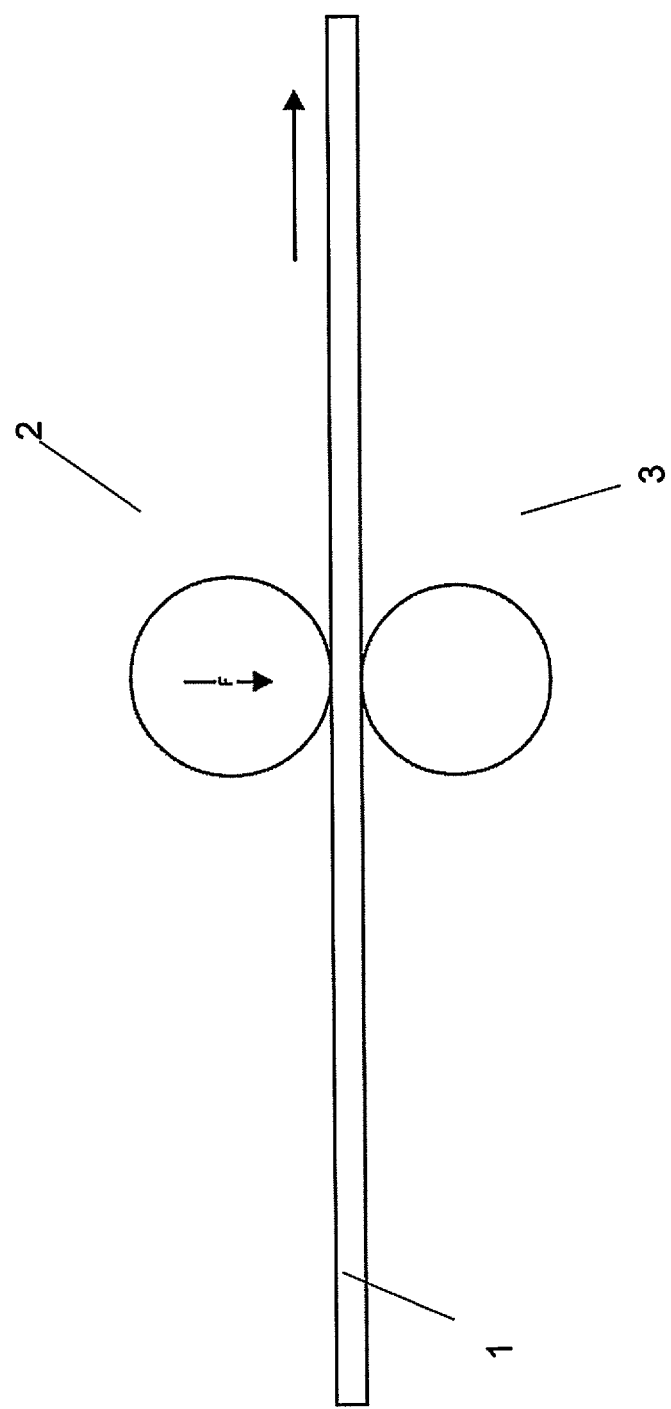

| | | |
|---|---|---|
| 6,915,829 B2 | 7/2005 | Popp et al. |
| 10,046,518 B2 | 8/2018 | Vogler |
| 2005/0145306 A1 | 7/2005 | Statnikov |
| 2011/0036897 A1* | 2/2011 | Nakai ................. H01L 24/81 228/1.1 |
| 2012/0285127 A1 | 11/2012 | Kamigaito |
| 2017/0282448 A1* | 10/2017 | Vogler ................. B06B 3/00 |

FOREIGN PATENT DOCUMENTS

| | | |
|---|---|---|
| CN | 105916474 A | 8/2016 |
| DE | 4206584 A1 | 3/1992 |
| DE | 19511698 C1 | 3/1995 |
| DE | 60319101 T2 | 1/2009 |
| EP | 2522492 A2 | 11/2012 |
| EP | 3092995 A1 | 11/2016 |
| WO | 2016074983 A1 | 5/2016 |

OTHER PUBLICATIONS

Kenji Miyazaki, Japanese Patent Office, Japanese Patent Application No. 2019-543041, Office Action, dated Oct. 23, 2020 (English translation).

Nora Lindner, International Preliminary Report on Patentability, PCT/EP2018/058937, World Intellectual Property Organization, dated Oct. 15, 2019.

China Patent Office, Office Action, dated Feb. 2, 2021, Co-pending Chinese Application 201880023784.6 (English Translation of Office Action Provided).

* cited by examiner

METHOD FOR INTERMITTENT ULTRASONIC PROCESSING OF A LENGTH OF MATERIAL

CROSS-REFERENCE TO RELATED APPLICATION

This application is a 371 national stage application of International Application PCT/EP2018/058937, filed Apr. 6, 2018, and claims the priority of German Application No. 10 2017 107 617.4, filed on Apr. 10, 2017.

The present invention relates to a method for intermittent ultrasonic processing of a length of material, wherein a length of material is moved through between a sonotrode and a counter-tool and the length of material is processed intermittently. Such methods and corresponding devices are known. For example, a device is described in DE 603 19 101 T2 in which a length of material is moved through between a sonotrode and a counter-tool and during the processing the sonotrode is pressed with a welding force onto the length of material. Whenever no processing is to take place, the sonotrode is moved away from the length of material.

In the known devices, the corresponding mechanical movement takes place either with the aid of a CAM control or by means of a cam control. If a rotating sonotrode or a rotating counter-tool is used then, alternatively, open chambers can be provided in the sealing surface of the sonotrode or counter-tool which interrupt an ultrasonic processing when the length of material is arranged opposite a chamber.

However, the regular movement back and forth of the sonotrode leads to problems with the guidance of the length of material, in particular at very high web velocities. In addition, high web velocities cannot be realised, since the sonotrode cannot be moved back and forth quickly enough.

Furthermore, the aforementioned cam control has the disadvantage that a change in the processing cycle necessitates an exchange of the cam control, which makes an undesirable machine down time necessary. The same applies to the use of rotating tools with chambers, since the tools must be used together with tools with correspondingly matched chamber dimensions.

Against the background of the described prior art, it is therefore the objective of the present invention to provide a method for intermittent ultrasonic processing of a length of material with which the disadvantages of the prior art can be avoided or at least reduced.

According to the invention, this objective is achieved in that in a processing interval the sonotrode is stimulated by an ultrasonic oscillation with an oscillation amplitude A and in a movement interval the sonotrode is stimulated with an oscillation amplitude B, wherein the oscillation amplitude A is greater than the oscillation amplitude B and during the processing interval and during the movement interval the length of material touches both the sonotrode and also the counter-tool.

According to the invention, the sonotrode is therefore no longer moved away from the length of material; instead, the oscillation amplitude is simply reduced when no processing is to take place.

In the simplest case, the generator which supplies the converter with the suitable electrical alternating current for generating the ultrasonic oscillation can be shut off during the movement interval.

However, it has been found that shutting off the sonotrode completely leads, on switching it on again, i.e. at the beginning of the next processing interval, to the period of time until the sonotrode is once again in the desired steady state being comparatively long, so that, in particular at high web velocities, the region in which an optimal processing of the length of material is not yet achieved is too long.

In a preferred embodiment, it is therefore the case that the oscillation amplitude B, i.e. the oscillation amplitude of the sonotrode, is greater than 0 in the movement interval. Thus, the oscillation amplitude of the ultrasonic oscillation is reduced, but this is not switched off.

A value of between 10% and 30% of the oscillation amplitude A during the processing interval has thereby proved advantageous for the oscillation amplitude B during the movement interval. As a rule, the oscillation amplitude A is dimensioned such that an optimal ultrasonic processing can take place. An even higher oscillation amplitude then leads to damage to the length of material and/or increased wear on the sonotrode or counter-tool. A lower oscillation amplitude no longer permits reliable processing. The oscillation amplitude B should therefore as far as possible be reduced in comparison with the oscillation amplitude A to the extent that no further processing of the length of material takes place.

In a further preferred embodiment, a rotary sonotrode with cylindrical sealing surface is used as sonotrode, wherein the sonotrode is rotated around the axis of rotation both during the processing interval and also during the movement interval. Alternatively or in combination, the counter-tool can be used as a roller counter-tool with cylindrical sealing surface, wherein the counter-tool is rotated around the axis of rotation both during the processing interval and also during the movement interval.

The web thus runs off the cylindrical sealing surface. Therefore, the circumferential velocity of the rotary sonotrode and/or of the counter-tool corresponds roughly to the web velocity of the length of material which is to be processed.

In a further preferred embodiment, the angle of rotation of the rotary sonotrode or of the roller counter-tool is detected and the beginning and end of the processing interval and/or movement interval determined depending on the detected angle of rotation.

As a result of this measure, the length of material can be processed in virtually any way. If for example a section of material with a defined length is to be processed, while the preceding and following sections of material are not to be processed, then the angular position of the rotary sonotrode is registered at the beginning of the processing interval and the change in the angular position detected during the processing. The angle of rotation determined in this way can be divided by 360° and multiplied by $2*\pi*r$ (r=radius of the cylindrical sealing surface) in order to determine the processed length of length of material. As soon as the desired length is reached, switchover to the movement interval can take place.

In a further preferred embodiment, the sonotrode or counter-tool is pressed onto the length of material with a predetermined force $F_A$ during a welding interval. It has been found that the welding result is improved if a constant force is applied to the length of material during the processing.

It can be advantageous if the sonotrode or counter-tool is pressed onto the length of material with a predetermined force $F_B$ during a standby interval, wherein the force $F_B$ is less than the force $F_A$.

The force with which the sonotrode or counter-tool is pressed onto the length of material in the standby interval is therefore reduced in comparison with the force with which the sonotrode or counter-tool is pressed onto the length of material during the welding interval.

The movement interval is thus the interval in which the sonotrode oscillates with the oscillation amplitude B.

The processing interval is the interval in which the sonotrode oscillates with an oscillation amplitude A.

The standby interval is the interval in which the sonotrode or the counter-tool is pressed onto the length of material with a force $F_B$.

The welding interval is the interval in which the sonotrode or the counter-tool is pressed onto the length of material with a force $F_A$.

Fundamentally, it is possible that the welding interval corresponds to the processing interval and the standby interval corresponds to the movement interval.

However, it has been found that it is best if the welding interval is shorter than the processing interval. The welding interval preferably lies within the processing interval, whereby the processing interval begins before the welding interval and the welding interval preferably ends before the processing interval.

In other words, if a processing of the length of material is to take place, the oscillation amplitude of the ultrasonic oscillation increases and the force with which the sonotrode or the counter-tool is pressed onto the length of material is then increased.

In a further preferred embodiment, a ramp interval is provided between the movement interval and the processing interval in which the oscillation amplitude of the ultrasonic oscillation of the sonotrode is increased from the oscillation amplitude B to the oscillation amplitude A, continuously or in several steps. This is because it has been found that it is not always possible to increase the oscillation amplitude abruptly without an overshoot effect occurring. Since the oscillation amplitude is generated by the generator, which is controlled accordingly, this abrupt change in the oscillation amplitude can only be realised with difficulty, so that under certain circumstances the oscillation amplitude can be increased too sharply and it takes a certain time until the desired oscillation amplitude has become established.

It is therefore advantageous if the oscillation amplitude is increased continuously or in several steps in order to improve the accuracy of regulation of the oscillation amplitude.

In a further preferred embodiment, during the processing interval, the movement interval and the ramp interval the length of material is moved through between the sonotrode and counter-tool with a constant web velocity v, wherein the length of the ramp interval is selected such that between 0.5 and 10 cm, preferably between 1 and 5 cm of the length of material is moved through between the sonotrode and counter-tool during the ramp interval.

Figure 2:
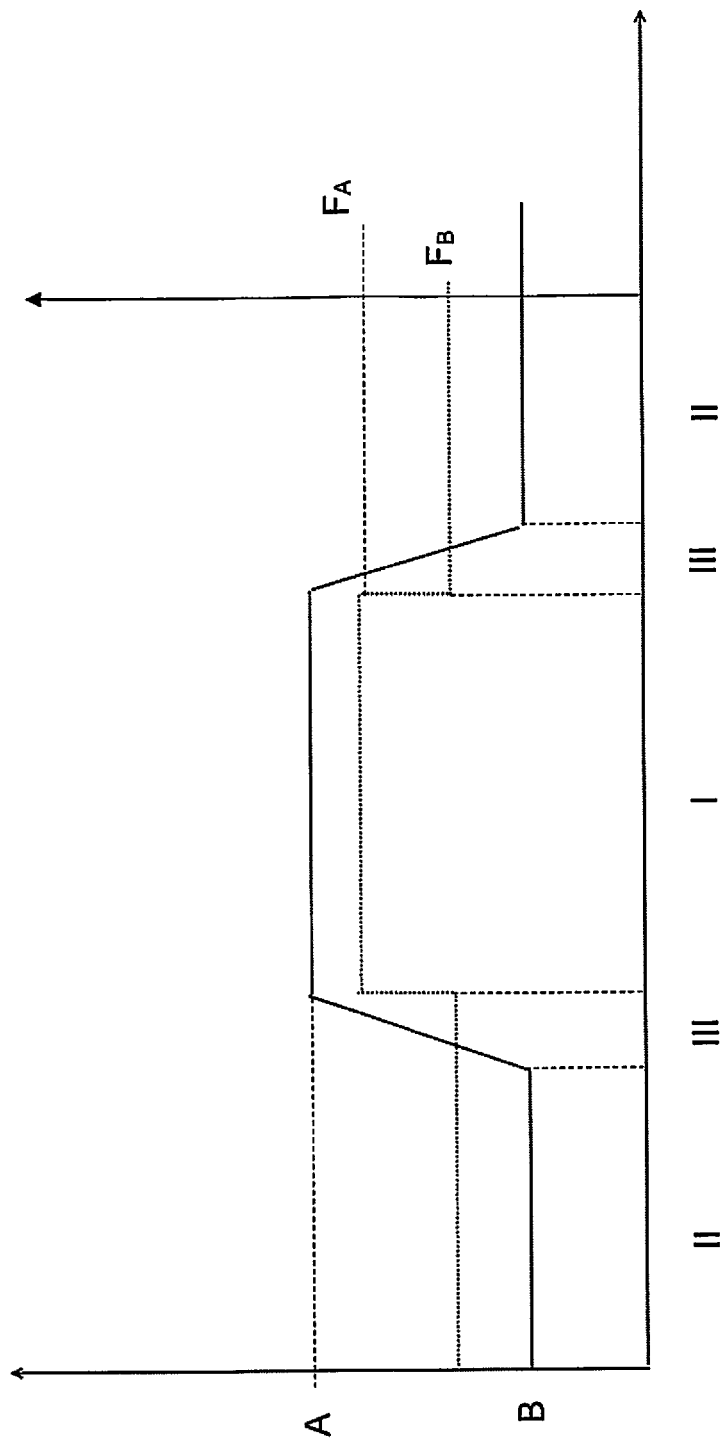

Further advantages, features and possible applications of the present invention become clear from the following description of a preferred embodiment together with the associated figures, wherein:

FIG. 1 shows a schematic representation of a device for carrying out the method and FIG. 2 shows a schematic representation of the time dependency of oscillation amplitude and force.

FIG. 1 shows a schematic representation of a device for carrying out a method for intermittent ultrasonic processing of a length of material. The length of material 1 is moved through, in the direction of the arrow, between a sonotrode 2 and a counter-tool 3. Both the sonotrode 2 and the counter-tool 3 are configured in the form of rollers in this embodiment. The sonotrode 2 is pressed in the direction of the counter-tool 3 with a force F, so that the length of material 1 is compressed between the sonotrode 2 and the counter-tool 3.

A processing of the length of material 1 takes place if the sonotrode 2 is pressed onto the length of material with the suitable welding force $F_A$ and the sonotrode oscillates with a suitable oscillation amplitude A.

However, there are applications in which the entire length of material 1 does not need to be processed, but rather only sections thereof require processing.

According to the invention, the oscillation amplitude of the ultrasonic oscillation of the sonotrode is therefore always reduced if no processing is to take place. While the length of material is still moved through between sonotrode and counter-tool, due to the reduced oscillation amplitude of the ultrasonic oscillation no processing takes place.

This is represented schematically in FIG. 2. In the diagram, both the oscillation amplitude (continuous line) and also the welding force (dotted line) with which the sonotrode is pressed in the direction of the counter-tool are plotted, in random units. It can be seen that in an interval I the oscillation amplitude assumes the value A and the force with which the sonotrode is moved in the direction of the counter-tool assumes the value $F_A$. The actual processing takes place in the interval I. Therefore, in this example the interval I corresponds to both the processing interval and also the welding interval. As already explained above, the processing interval and welding interval do not necessarily need to be identical.

Before and after the processing interval I, during a movement interval II both the oscillation amplitude is reduced to the value B and the force with which the sonotrode is pressed in the direction of the counter-tool is reduced to the value $F_B$.

No processing takes place during the movement interval II. A ramp interval III, in which the oscillation amplitude is continuously increased or reduced, is drawn in here between the movement interval II and the processing interval I. Even though, in the example shown, the oscillation amplitude is changed in a linear manner in the ramp interval, non-linear changes, for example a stepped increase or reduction in the oscillation amplitude, are also possible.

Even though an abrupt increase in force from the force $F_B$ to the force $F_A$ and an abrupt decrease in force from the force $F_A$ to the force $F_B$ is shown in the figure, this does not as a rule need to be realised completely. As a rule, on closer inspection the change in force will also take place not abruptly, but gradually.

In the embodiment shown, only the sonotrode 2 is excited with an ultrasonic oscillation. Alternatively however, it is also possible to use a second sonotrode as counter-tool, so that the length of material is passed through between two sonotrodes. In this case the oscillation amplitude of the ultrasonic oscillation of at least one of the two sonotrodes should be reduced in the movement interval, whereby it is best if the oscillation amplitudes of both sonotrodes are reduced.

LIST OF REFERENCE SYMBOLS 1 length of material
2 sonotrode
3 counter-tool
A oscillation amplitude
F force
$F_A$ welding force
I processing interval II movement interval
III ramp interval

The invention claimed is:

1. Method for intermittent ultrasonic processing of a length of material, wherein a length of material is moved with a web velocity through between a sonotrode with a cylindrical surface and a counter-tool with a cylindrical surface, a circumferential velocity of the sonotrode and of the counter-tool corresponding to the web velocity of the length of material which is to be processed and the length of material is processed intermittently, stimulating the sonotrode by an ultrasonic oscillation with an oscillation amplitude A in a processing interval and stimulating the sonotrode with an oscillation amplitude B in a movement interval, wherein B<A, and during the processing interval and during the movement interval the length of material touches both the sonotrode and also the counter-tool.

2. Method according to claim 1, wherein the oscillation amplitude B>0.

3. Method according to claim 2, wherein the oscillation amplitude B during the movement interval amounts to between 10% and 30% of the oscillation amplitude A during the processing interval.

4. Method according to claim 1, wherein a rotary sonotrode with cylindrical sealing surface is selected as sonotrode and the sonotrode is rotated around the axis of rotation through an angle of rotation both during the processing interval and also during the movement interval.

5. Method according to claim 4, wherein the angle of rotation of the rotary sonotrode is detected and the beginning and end of the processing interval and the movement interval are determined, depending on the detected angle of rotation.

6. Method according to claim 1, wherein the sonotrode or counter-tool is pressed onto the length of material with a predetermined force $F_A$ during a welding interval.

7. Method according to claim 6, wherein the sonotrode or counter-tool is pressed onto the length of material with a predetermined force $F_B$ during a standby interval, wherein the force $F_B<F_A$.

8. Method according to claim 6, wherein the welding interval is shorter than the processing interval.

9. Method according to claim 6, wherein the welding interval lies within the processing interval, wherein the processing interval begins before the welding interval.

10. Method according to claim 1, wherein a ramp interval is provided between the movement interval and the processing interval in which the oscillation amplitude of the ultrasonic oscillation of the sonotrode is increased from the oscillation amplitude B to the oscillation amplitude A, continuously.

11. Method according to claim 10, wherein, during the processing interval, the movement interval and the ramp interval the length of material is moved through between the sonotrode and counter-tool with a constant web velocity v, wherein the length of the ramp interval is selected such that between 0.5 and 10 cm of the length of material is moved through between the sonotrode and counter-tool during the ramp interval.

12. Method according to claim 9 wherein the welding interval ends before the processing interval.

13. Method according to claim 1, wherein a ramp interval is provided between the movement interval and the processing interval in which the oscillation amplitude of the ultrasonic oscillation of the sonotrode is increased from the oscillation amplitude B to the oscillation amplitude A, in several steps.

14. Method according to claim 10, wherein, during the processing interval, the movement interval and the ramp interval, the length of material is moved through between the sonotrode and counter-tool with a constant web velocity v, wherein the length of the ramp interval is selected such that between 1 and 5 cm of the length of material is moved through between the sonotrode and counter-tool during the ramp interval.

15. Method according to claim 4, wherein the angle of rotation of the rotary sonotrode is detected and the beginning and end of the processing interval or the movement interval is determined, depending on the detected angle of rotation.

16. A method according to claim 1, wherein during the movement interval the length of material is moved through between the sonotrode and the counter-tool.

* * * * *